United States Patent
Fukano et al.

(10) Patent No.: US 9,400,062 B2
(45) Date of Patent: Jul. 26, 2016

(54) THERMOELEMENT AND THERMOVALVE INCORPORATING THERMOELEMENT

(71) Applicant: SMC CORPORATION, Chiyoda-ku (JP)

(72) Inventors: Yoshihiro Fukano, Moriya (JP); Takayuki Murai, Moriya (JP); Hikaru Tsuyuki, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/649,718

(22) PCT Filed: Oct. 31, 2013

(86) PCT No.: PCT/JP2013/079553
§ 371 (c)(1),
(2) Date: Jun. 4, 2015

(87) PCT Pub. No.: WO2015/063922
PCT Pub. Date: May 7, 2015

(65) Prior Publication Data
US 2015/0316165 A1  Nov. 5, 2015

(51) Int. Cl.
*F03G 7/06* (2006.01)
*F16K 31/00* (2006.01)
*G05D 23/02* (2006.01)

(52) U.S. Cl.
CPC .............. *F16K 31/002* (2013.01); *F03G 7/06* (2013.01); *G05D 23/021* (2013.01); *Y10T 137/1963* (2015.04)

(58) Field of Classification Search
CPC ... Y10T 137/1963; F16K 31/002; F03G 7/06; G05D 23/021
See application file for complete search history.

(56) References Cited

U.S. PATENT DOCUMENTS

| 3,016,747 | A | * | 1/1962 | Vernet | G05D 23/021 236/DIG. 5 |
| 3,291,216 | A | * | 12/1966 | Merrill | A62C 37/12 137/72 |
| 3,777,495 | A | * | 12/1973 | Kuze | F03G 7/06 277/565 |
| 3,874,455 | A | * | 4/1975 | Klesow | A62C 37/14 169/19 |
| 3,990,418 | A | * | 11/1976 | Nohira | F02M 26/58 123/568.31 |

(Continued)

FOREIGN PATENT DOCUMENTS

| GB | 1143078 A | * | 2/1969 | G01K 5/44 |
| GB | 1166280 A | * | 10/1969 | G01K 5/44 |

(Continued)

OTHER PUBLICATIONS

International Search Report issued Nov. 26, 2013 in PCT/JP2013/079553 filed Oct. 31, 2013.

*Primary Examiner* — Kevin Murphy
*Assistant Examiner* — David Colon Morales
(74) *Attorney, Agent, or Firm* — Oblon, McClelland, Maier & Neustadt, L.L.P.

(57) ABSTRACT

A thermoelement and a thermovalve incorporating the same, in which reliable operation is achieved with a simple internal structure, and there is no risk of contaminant jamming. The thermoelement includes a casing, a mounting portion, a shaft, a heat-sensitive medium, and a seal member for drawing the shaft into the casing when the heat-sensitive medium expands. The thermovalve includes a body including a valve body linked to a shaft of a thermoelement, and a seating part on/from which the valve body can be seated/separated.

7 Claims, 9 Drawing Sheets

(56) References Cited

U.S. PATENT DOCUMENTS

| | | | | |
|---|---|---|---|---|
| 4,036,433 A * | 7/1977 | Wagner | G05D 23/185 | 137/625.26 |
| 4,248,402 A * | 2/1981 | Meckstroth | F16K 31/002 | 251/11 |
| 4,337,621 A * | 7/1982 | Lane, Jr. | G05D 23/021 | 236/100 |
| 4,346,837 A * | 8/1982 | Inagaki | G05D 23/021 | 236/100 |
| 4,441,317 A * | 4/1984 | Wolfe | G05D 23/021 | 184/25 |
| 4,685,651 A * | 8/1987 | Nouvelle | G05D 23/30 | 236/68 R |
| 4,883,225 A * | 11/1989 | Kitchens | F01P 7/16 | 137/73 |
| 5,033,865 A * | 7/1991 | Kuze | G05D 23/1326 | 236/101 C |
| 5,052,181 A * | 10/1991 | Asada | G05D 23/021 | 60/527 |
| 5,119,061 A * | 6/1992 | Kuze | G05D 23/021 | 236/100 |
| 5,177,963 A * | 1/1993 | Kuze | G05D 23/021 | 374/160 |
| 5,423,342 A * | 6/1995 | Fenner, Jr. | G05D 16/0661 | 137/14 |
| 5,738,276 A * | 4/1998 | Saur | F16K 17/38 | 236/92 C |
| 6,052,993 A * | 4/2000 | Gadini | F03G 7/06 | 60/527 |
| 6,336,510 B1 * | 1/2002 | Gadini | A62C 37/21 | 137/79 |
| 6,427,712 B1 * | 8/2002 | Ashurst | E03B 7/10 | 137/2 |
| 6,988,364 B1 * | 1/2006 | Lamb | F16K 31/002 | 60/508 |
| 7,175,102 B2 * | 2/2007 | Inoue | G05D 23/021 | 236/100 |
| 2010/0095669 A1 * | 4/2010 | Loveday | F15B 21/06 | 60/527 |
| 2012/0090815 A1 * | 4/2012 | Cameron | F16K 31/002 | 165/67 |

FOREIGN PATENT DOCUMENTS

| | | |
|---|---|---|
| JP | 07-006675 | 1/1995 |
| JP | 09-089153 | 3/1997 |
| JP | 2005-180461 | 7/2005 |

* cited by examiner

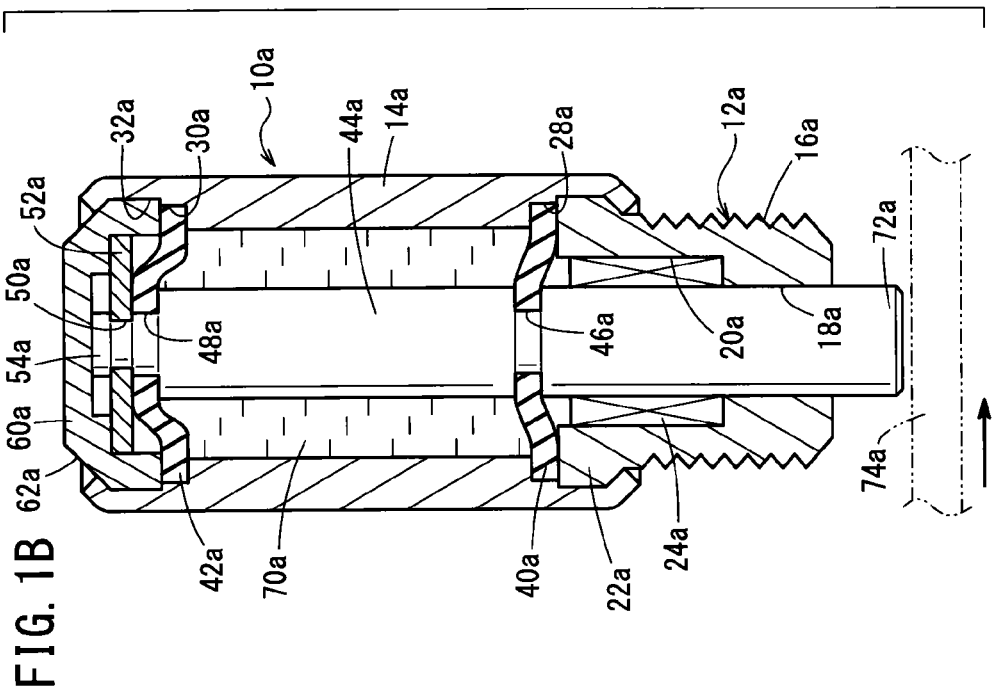
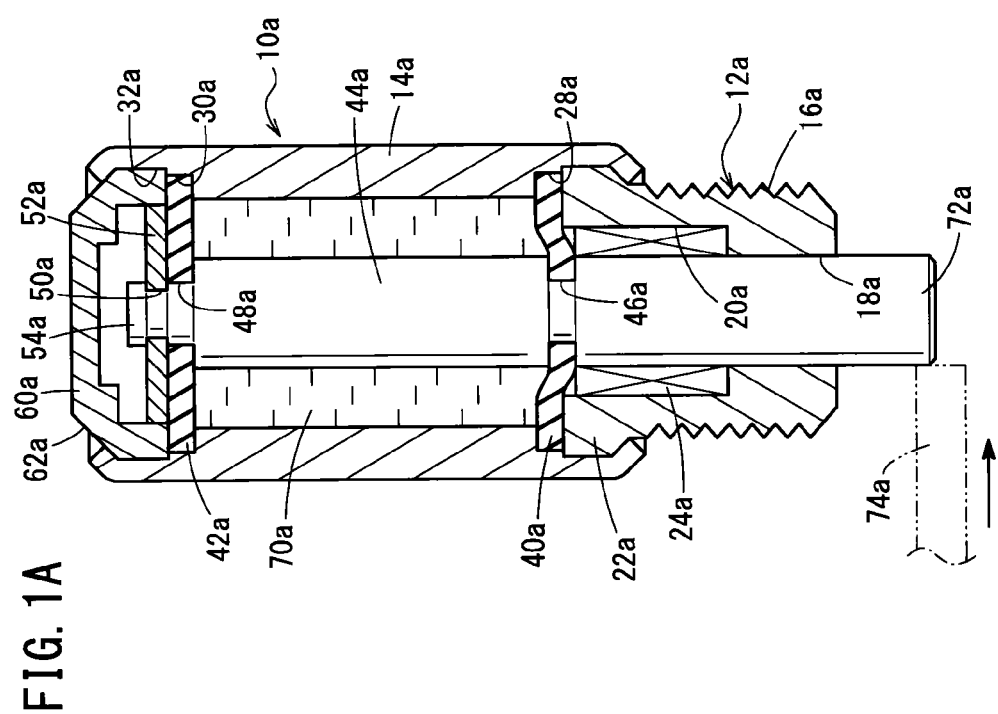

(12) United States Patent
US 9,400,062 B2

THERMOELEMENT AND THERMOVALVE INCORPORATING THERMOELEMENT

TECHNICAL FIELD

The present invention relates to a thermoelement and a thermovalve incorporating a thermoelement, and more specifically, relates to a thermoelement and a thermovalve incorporating the thermoelement, in which a displacement means advances and retracts along with contractive and expansive actions of a thermosensitive medium.

BACKGROUND ART

Heretofore, a thermoelement for displacing a displacement means such as a shaft and a thermovalve in which the thermoelement is incorporated has been proposed, in which attention is focused on an expansive action of a thermosensitive fluid caused by a rise in the ambient temperature.

In Japanese Laid-Open Patent Publication No. 07-006675, an invention referred to as an "ampblock system wax type thermostat" is disclosed. According to the disclosure of Japanese Laid-Open Patent Publication No. 07-006675, a structure is revealed in which a wax 2, which is enclosed in a temperature sensing part 1, expands accompanying a rise in the ambient temperature, whereby a diaphragm 3 flexes and rises upwardly. As a result, solid particulate matter 18, which is housed in an amp space 16, rises and is displaced to thereby displace a piston 5.

An invention referred to as a "thermo-actuator" is disclosed in Japanese Laid-Open Patent Publication No. 09-089153. According to such a "thermo-actuator," a wax 11 fills a space between a rubber seal spool 5 and a thermosensitive cylinder 9. In a state in which the thermosensitive cylinder 9 is cooled, the wax 11 shrinks upon solidification thereof, and since the area occupied by the wax 11 is reduced, a rubber seal straight pipe 3 is pressed under a spring load and is compressed in a bellows-like shape, whereby a rod 2 is pressed deeply into the rubber seal spool 5 to occupy an initial position. When the thermosensitive cylinder 9 reaches a predetermined temperature accompanying a rise in the ambient temperature, the wax 11 inside the thermosensitive cylinder 9 expands and the pressure thereof increases, so that as the seal spool 5 becomes flattened, the rod 2 is squeezed upwardly, and thus the bellows 3 rises and is restored to the form of a straight pipe.

An invention referred to as a "thermovalve" is disclosed in Japanese Laid-Open Patent Publication No. 2005-180461. According to this invention, a thermovalve 4 is inserted and arranged along an axial direction of a lubricating oil inlet 1. When the lubricating oil that flows through the lubricating oil inlet 1 rises to a predetermined temperature, a thermally actuated member 6a inside a thermoelement 6 that makes up the thermovalve 4 expands, whereby a rod 6b is pushed out and presses down a valve plug 7, and the lubricating oil is allowed to flow into an oil cooler from a lubricating oil outlet 2.

SUMMARY OF INVENTION

Incidentally, the ampblock system wax type thermostat disclosed in Japanese Laid-Open Patent Publication No. 07-006675 is of a configuration in which a piston 5 is made to project from a piston retainer 10 by expansion of the wax 2. Further, in the thermo-actuator of Japanese Laid-Open Patent Publication No. 09-089153 as well, when the temperature of the wax 11 that is accommodated inside the thermosensitive cylinder 9 rises to a predetermined temperature, the rod 2 is made to project out from the thermosensitive cylinder 9.

Furthermore, the thermovalve of Japanese Laid-Open Patent Publication No. 2005-180461 is of a configuration in which, when the thermally actuated member 6a constituting the thermoelement 6 detects a predetermined temperature, the rod 6b becomes elongated and extends from the thermoelement 6.

More specifically, in any of the inventions of Japanese Laid-Open Patent Publication No. 07-006675, Japanese Laid-Open Patent Publication No. 09-089153, and Japanese Laid-Open Patent Publication No. 2005-180461, by using the fact that the fluid is thermally expanded accompanying a rise in the ambient temperature, a rod or a shaft is made to project outwardly to thereby accomplish a desired function.

However, as is clear from the above actions, the aforementioned thermoelements are of a press-out type, and more specifically, of a type in which a rod or a shaft is pressed outwardly accompanying a rise in the ambient temperature. Consequently, by assembling this type of thermoelement on another apparatus, although it is possible to carry out a desired operation accompanying an advancing action of the rod or the shaft, on the other hand, there is a drawback in that the presence of the advanced rod or the like produces an adverse effect.

For example, when this type of thermoelement is assembled on a valve apparatus that faces toward a fluid passage, the structure in the interior of the valve apparatus becomes complex, and by the advancing operation of the rod, since the end of the rod projects into the fluid passage, an inconvenience occurs in that the pass-through area of the fluid that flows through the fluid passage is narrowed, and smooth flow of the fluid is impeded.

Furthermore, since the end of the rod or the like penetrates into the interior of the flowing fluid, biting-in of foreign matter takes place, whereas the valve structure has to be made more robust and it is inevitable that the size thereof is made larger in scale. Along therewith, a rise in manufacturing costs is unavoidable.

The present invention has been devised with the aim of overcoming the various drawbacks mentioned above, and has the object of providing a thermoelement and a thermovalve in which such a thermoelement is incorporated, in which a pulling operation is performed on a rod or a shaft that constitutes part of the thermoelement by expansion of a thermosensitive fluid having reached a predetermined temperature, whereby the internal structure of the thermoelement can be simplified and reduced in size while also enhancing durability.

The present invention includes a casing, a mount formed integrally with the casing and which is attached to an object, a shaft arranged displaceably in an interior of the casing with one end thereof being exposed to an exterior from the mount, a thermosensitive medium enclosed in the interior of the casing and which expands and contracts responsive to a change in ambient temperature surrounding the casing, and a seal member that pulls the shaft toward a side of the casing upon expansion of the thermosensitive medium.

According to the present invention, when the ambient temperature reaches the predetermined value, the thermosensitive medium expands, and the shaft is pulled or drawn in via the seal member toward the side of the casing. Consequently, a control for transporting workpieces or for interrupting the flow of a fluid can easily be performed.

Further, according to the present invention, the seal member preferably engages with another end of the shaft, and the shaft is pulled into the casing by flexure of the seal member in response to expansion of the thermosensitive medium.

Thus, with a simple configuration, an advancing and retracting operation of the shaft can be carried out assuredly.

Furthermore, according to the present invention, a tapered surface, which expands in diameter toward the other end, preferably is formed on a side of the other end of the shaft. Further, a portion of the seal member may be in contact with the tapered surface, such that upon expansion of the thermosensitive medium, the portion of the seal member preferably is pressed against the tapered surface of the shaft, whereby the shaft is displaced toward the other end side.

Thus, at the time that the thermosensitive medium undergoes expansion, the tapered surface, which is provided on the other end side of the shaft, can reliably cause the shaft to be displaced by the seal member.

The present invention further is characterized by a thermovalve, which is made up from a thermoelement and a valve main body in which the thermoelement is incorporated. In this case, the thermoelement includes a casing, a mount formed integrally with the casing and which is attached to an object, a shaft arranged displaceably in an interior of the casing with one end thereof being exposed to an exterior from the mount, a thermosensitive medium enclosed in the interior of the casing and which expands and contracts responsive to a change in ambient temperature surrounding the casing, and a seal member that pulls the shaft toward a side of the casing upon expansion of the thermosensitive medium. On the other hand, the valve main body includes a body formed with an inlet port into which a fluid is introduced and an outlet port through which the fluid is led out, a seat member disposed between the inlet port and the outlet port, and a valve plug that presses against and separates away from the seat member. One end of the shaft constituting the thermoelement is connected to the valve plug, such that upon expansion of the thermosensitive medium, the seal member pulls the shaft, whereby the valve plug is made to separate away from the seat member and allow communication between the inlet port and the outlet port.

When the thermosensitive fluid undergoes expansion, the shaft of the thermoelement is pulled inward, whereby the valve plug, which normally is closed, separates away from the seat member. Therefore, in a state in which no obstacle is present, i.e., in which the fluid passage area is not reduced, the fluid can pass freely between the inlet port and the outlet port, and biting-in of foreign matter does not occur. Consequently, without increasing the size of the valve itself, flow blockage of a required amount of the fluid can be carried out.

As a matter of course, the aforementioned thermovalve may be either a direct-acting type or a pilot type of thermovalve.

With the thermoelement according to the present invention, by the ambient temperature reaching the predetermined value, the thermosensitive medium expands and the shaft is pulled or drawn in toward the side of the casing. Consequently, a control for transporting workpieces or a flow-through control for a fluid can easily and reliably be carried out responsive to a change in temperature.

Further, with the thermovalve in which a thermoelement is incorporated according to the present invention, by expansion and contraction of the thermosensitive medium, advancing and retracting operations of the shaft of the thermoelement are performed, and along therewith, the valve plug opens and closes the fluid passage. In particular, since an operation to pull in the shaft is produced by expansion of the thermosensitive medium, the fluid can be made to flow without a decrease in area of the flow passage, and biting-in of foreign matter does not occur. Consequently, an effect is obtained in that, without increasing the size of the valve itself, flow blockage of a required amount of the fluid can be carried out.

BRIEF DESCRIPTION OF DRAWINGS

FIG. 1A is a vertical cross-sectional view showing an extended state of a shaft of a thermoelement according to a first embodiment of the present invention;

FIG. 1B is a vertical cross-sectional view showing a contracted state of the shaft;

DESCRIPTION OF EMBODIMENTS

Figure 2A:
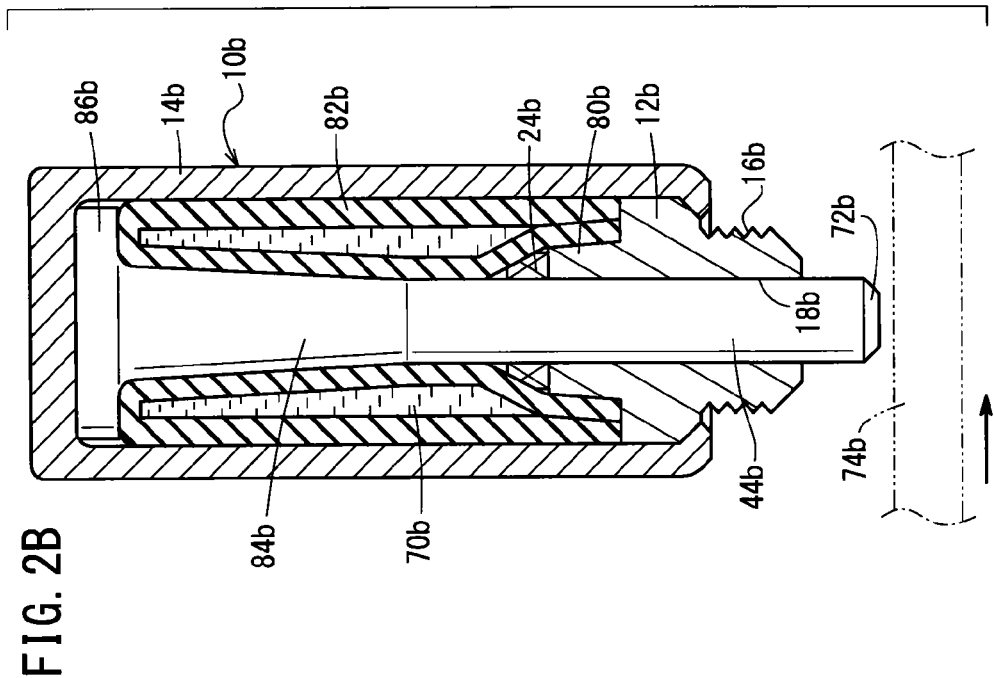
FIG. 2A is a vertical cross-sectional view showing an extended state of a shaft of a thermoelement according to a second embodiment of the present invention.

A preferred embodiment in relation to a thermoelement according to the present invention, and a thermovalve in which the thermoelement is incorporated, will be described in detail below with reference to the accompanying drawings.

At first, various embodiments will be presented and described in detail in relation to basic structures of the thermoelement.

FIGS. 1A and 1B show a first embodiment of the thermoelement according to the present invention. In the embodiments described below, the same reference numerals are used to designate elements having the same structure or that carry out similar functions, with English letters a-e being appended to such numerals for each of the respective embodiments. Accordingly, across all of the embodiments, structural elements thereof designated by the same reference numerals are assumed to carry out the same functions, and detailed description of such features will not be described anew.

In FIGS. 1A and 1B, reference character 10a indicates a thermoelement according to the present invention. The thermoelement 10a includes a mount 12a made of metal and which is mounted on an object (not shown), and a casing 14a made of metal, a lower end of which is crimped and fastened to the mount 12a, and which is rich in thermosensitivity. Male threads 16a are engraved around the mount 12a, and a through hole 18a is formed in the mount 12a along the axis thereof. The through hole 18a expands in diameter on an upper end side, with an annular groove 20a being formed therein. As shown in the drawing, the upper end above the male threads 16a is expanded in diameter, thereby forming a flange 22a. A guide member 24a for ensuring smooth operation of a later-described shaft is fitted into the annular groove 20a.

The casing 14a is made up from a cylindrical body, and as illustrated, is thin-walled on the lower end thereof, which is fitted over and attached by crimping onto the flange 22a of the mount 12a from an outer side. An annular groove 28a is formed in the vicinity of the lower end of the casing 14a, and another annular groove 30a is formed in the vicinity of the upper end of the casing 14a. A further annular groove 32a, which connects to the upper part of the annular groove 30a and is slightly larger in diameter than the annular groove 30a, is provided in the casing 14a.

As understood from FIGS. 1A and 1B, a first seal member 40a, in which a through hole is formed in the center thereof, is installed in the annular groove 28a. A second seal member 42a, in which a through hole is formed in the center thereof, is installed in the annular groove 30a. The first seal member 40a and the second seal member 42a are made from a flexible material such as synthetic rubber or the like. A shaft 44a is inserted through the casing 14a in connection with the first seal member 40a and the second seal member 42a. As shown in FIGS. 1A and 1B, the lower end of the shaft 44a is inserted into the through hole 18a, and the first seal member 40a is fitted into an annular groove 46a disposed under a central region of the shaft 44a using the through hole thereof. Further, the second seal member 42a is fitted into an annular groove 48a disposed on an upper end side of the shaft 44a using the through hole thereof. Furthermore, a metallic ring-shaped stopper 52a is fitted into an annular groove 50a provided on the shaft 44a at a location above the annular groove 48a.

In FIGS. 1A and 1B, reference character 54a indicates a flange that prevents the second seal member 42a and the stopper 52a from coming away from the shaft 44a.

Next, a cap 60a, which is made of metal, is fitted into the annular groove 32a. As can be understood from FIGS. 1A and 1B, the cap 60a contacts the outer circumferential surface of the stopper 52a, while also pressing down on the upper surface of the second seal member 42a that is seated in the annular groove 30a. The flange 54a is arranged inside the space formed by the cap 60a and the stopper 52a. An upper end of the casing 14a is crimped inwardly in surrounding relation to a tapered surface 62a, which is formed on an upper corner of the cap 60a, to thereby firmly retain the cap 60a.

In such a structure, prior to mounting the second seal member 42a in the annular groove 30a, a fluid, for example a wax 70a, which is made of a thermosensitive material and is capable of expanding and contracting due to a rise in the ambient temperature, fills or charges an annular or torus-shaped space that is formed by the casing 14a and the shaft 44a. In particular, the wax 70a preferably is a thermosensitive material that exhibits thermal expansion abundantly upon heating.

The thermoelement 10a according to the first embodiment of the present invention is constructed basically as described above. Next, operations and effects of the thermoelement 10a will be described.

First, in FIG. 1A, a condition is shown in which, under normal temperature, a distal end 72a of the shaft 44a is exposed to the exterior from the lower end of the through hole 18a, and a central portion of the first seal member 40a is flexed downwardly. On the other hand, the second seal member 42a remains in a flat state. In such an initial state, a workpiece 74a, which is transported from a non-illustrated conveyor in the direction of the arrow, abuts against the distal end 72a. Thus, the distal end 72a of the shaft 44a prevents further movement of the workpiece 74a.

When the ambient temperature rises above a predetermined value, the wax 70a, which is made of a thermosensitive material, expands, and ultimately, the second seal member 42a is pressed upwardly by the wax 70a. Along therewith, the shaft 44a with which the second seal member 42a is engaged rises upwardly along the guide member 24a, so that ultimately, the flange 54a reaches the ceiling surface of the cap 60a, and further upward movement thereof is inhibited. Accompanying the upward movement of the shaft 44a, the first seal member 40a and the second seal member 42a are flexed upwardly as shown in FIG. 1B. At this time, the distal end 72a of the shaft 44a naturally releases from engagement with the workpiece 74a, and assuming that the conveying operation of the non-illustrated conveyor continues, the displacement operation of the workpiece 74a in the direction of the arrow is carried out.

Consequently, the male threads 16a of the mount 12a are engaged beforehand with the object, i.e., in screw grooves of a non-illustrated apparatus, whereby the thermoelement 10a is fixed thereon, and assuming that the thermoelement 10a is disposed in the vicinity of a non-illustrated conveyor, a control can be carried out with respect to advancing movements, stoppage, and restored movements of the workpiece 74a accompanying a change in temperature. For example, under ordinary temperature, the conveying operation of the workpiece 74a is prevented, whereas when the predetermined temperature is reached, an advancing movement of the workpiece 74a can be performed. Such an operation can be implemented by a so-called pulling operation to pull the shaft 44a that makes up the thermoelement 10a into the interior of the element.

Figure 2B:
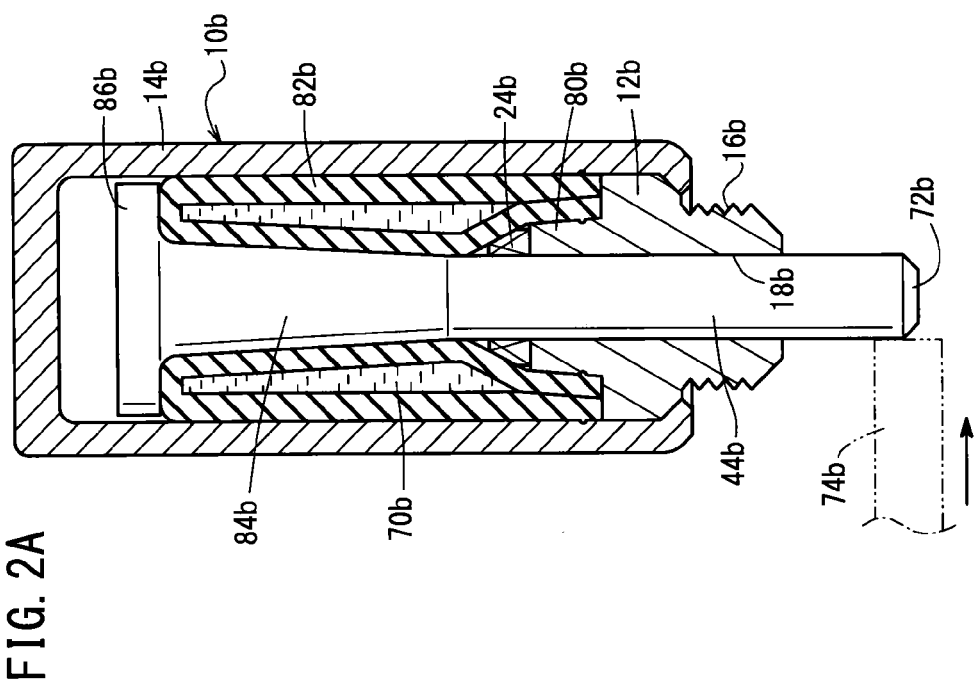
FIG. 2B is a vertical cross-sectional view showing a contracted state of the shaft.

FIGS. 2A and 2B show a second embodiment of the thermoelement according to the present invention.

According to the second embodiment, a casing 14b that makes up a thermoelement 10b is constituted in the form of a bottomed cylinder made of metal. A mount 12b includes an annular projection 80b positioned along the axial direction, which is crimped onto a lower end of the casing 14b. A guide member 24b is installed on an upper end of the mount 12b, and the outer circumferential surface of the annular projection 80b of the mount 12b is formed in a tapered shape. A seal member 82b is disposed between the outer circumferential surface of the tapered portion of the annular projection 80b and the inner circumferential surface of the casing 14b. A tapered surface 84b is formed on an upper portion of a shaft 44b, and a flange 86b is formed at a position on the rear end of the tapered surface 84b. The top surface of the flange 86b is disposed in facing relation to the upper bottomed surface of the casing 14b. An expandable/contractible seal member 82b made of synthetic rubber or the like is installed in the interior of the casing 14b, using the side wall of the casing 14b which is constructed in the foregoing manner, the tapered surface 84b, the tapered surface of the annular projection 80b, and the outer periphery of the guide member 24b. A wax 70b, which undergoes expansion at or above a predetermined temperature, is enclosed in an interior space that is formed as a result of folding the cylindrical seal member 82*b* in two overlapping layers.

The thermoelement 10*b* according to the second embodiment is constructed basically as described above. First, when the thermoelement 10*b* is assembled, the flange 86*b* side thereof is inserted into the casing 14*b*, and next, the seal member 82*b* is inserted so that a substantially central portion thereof comes into contact with the bottom surface of the flange 86*b*. Thereafter, the guide member 24*b* is inserted into a substantial center of the seal member 82*b*. Then, the mount 12*b* is inserted into the casing 14*b*, such that both ends of the seal member 82*b* become sandwiched between the tapered surface of the annular projection 80*b* and the annular circumferential wall of the casing 14*b*, and are seated on an annular stepped part of the mount 12*b*.

Lastly, the bottom part of the casing 14*b* is crimped with respect to the mount 12*b* to thereby complete fabrication of the thermoelement 10*b*.

When the thermoelement 10*b*, which is obtained in the foregoing manner, is put to use, at first, male threads 16*b* of the mount 12*b* are screw-inserted into a non-illustrated apparatus. As a result, similar to the first embodiment, a distal end 72*b* of the shaft 44*b* extends outwardly from the lower end of the mount 12*b*. In such an outwardly extended state, a non-illustrated conveyor is energized and a workpiece 74*b* is displaced in the direction of the arrow. As a result, similar to the first embodiment, the workpiece 74*b* comes into abutment against the distal end 72*b*, and further displacement of the workpiece 74*b* is prevented. When the ambient temperature changes, whereby the wax 70*b* reaches the predetermined temperature and is thermally expanded, the wax 70*b* imposes an applied pressure with respect to the seal member 82*b*. Therefore, the inner wall surface of the seal member 82*b* presses on the tapered surface 84*b* of the shaft 44*b*, and using the tapered surface 84*b*, the shaft 44*b* is pressed upwardly. The flange 86*b* ultimately reaches the inner wall surface of the casing 14*b*, whereby further upward displacement thereof is prevented. At this time, the lower end of the shaft 44*b* undergoes an upwardly rising retreating motion. Consequently, since movement of the workpiece 74*b*, which was prevented by the distal end 72*b* of the shaft 44*b*, is allowed again, the workpiece 74*b* can be moved to a next step by the non-illustrated conveyor.

Figure 3A:
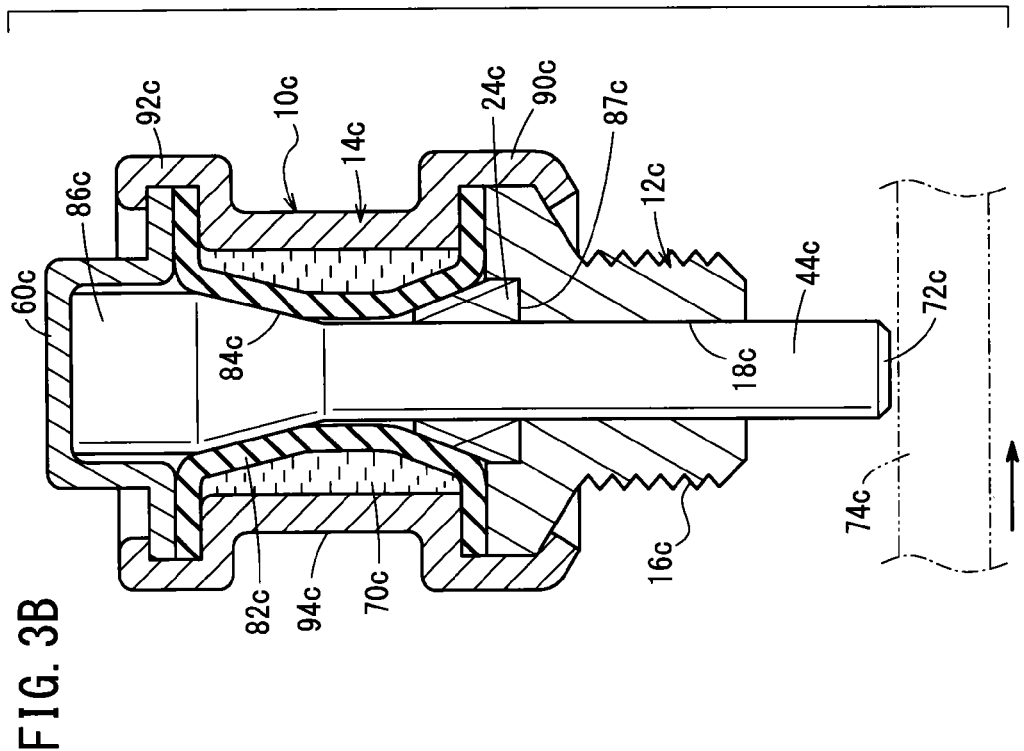
FIG. 3A is a vertical cross-sectional view showing an extended state of a shaft of a thermoelement according to a third embodiment of the present invention.
Figure 3B:
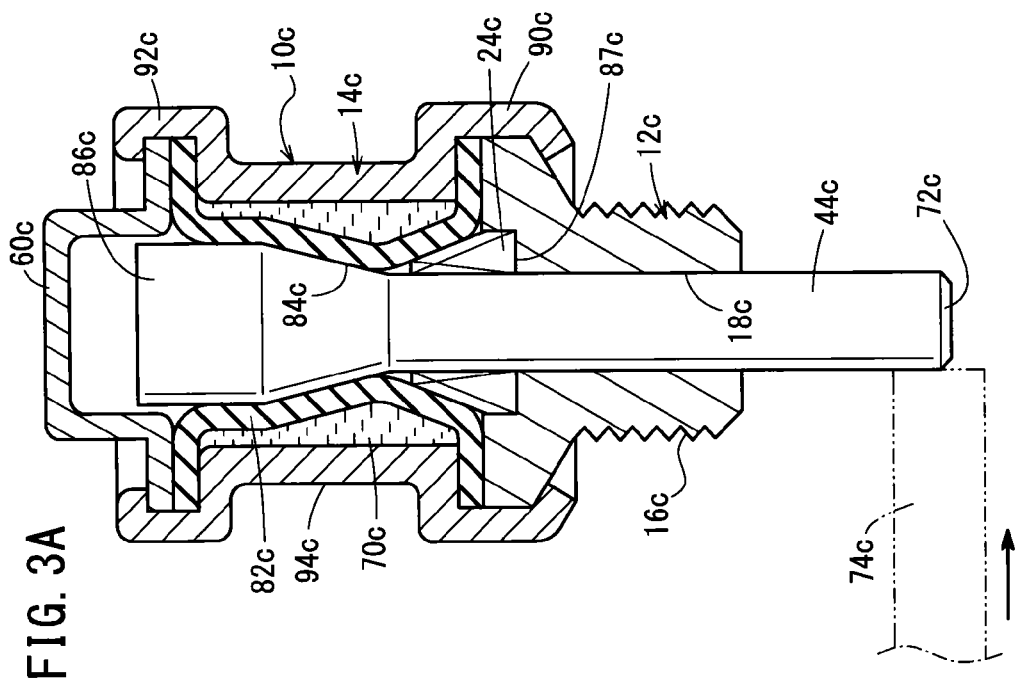
FIG. 3B is a vertical cross-sectional view showing a contracted state of the shaft.

FIGS. 3A and 3B show a third embodiment of the thermoelement according to the present invention.

With the third embodiment, a casing 14*c*, which is assembled together integrally with a mount 12*c*, is made up from a ring-shaped body, including a large diameter portion 90*c*, which is crimped onto and fixed to the mount 12*c* at a lower end of the casing 14*c*, and a small diameter portion 92*c* on the upper end thereof. A shaft 44*c*, which advances and retracts with respect to the mount 12*c*, is a metal rod that includes a tapered surface 84*c* on the upper end thereof.

An annular groove 87*c* is disposed on the upper end of the mount 12*c*. The lower end of a seal member 82*c* is seated on the top surface of the mount 12*c* between the large diameter portion 90*c* and the mount 12*c*. The upper end of the seal member 82*c* is seated on a stepped part that makes up the small diameter portion 92*c* of the casing 14*c*. A cap 60*c* is inserted into an upper open part of the small diameter portion 92*c*, and a top part of the small diameter portion 92*c* is crimped, whereby the cap 60*c* is retained between the crimped top part and the upper end of the seal member 82*c*. The middle portion of the seal member 82*c* is constructed to surround and contact the tapered surface 84*c* that is formed midway along the shaft 44*c*. A thermosensitive wax 70*c* is enclosed as a fluid between the seal member 82*c* and a trunk portion 94*c* of the casing 14*c*.

In FIGS. 3A and 3B, reference character 24*c* indicates a guide member that is seated in the annular groove 87*c* provided in the mount 12*c*.

As easily understood from FIG. 3A, under ordinary temperature, a distal end 72*c* of the shaft 44*c* projects downward by a predetermined distance from the lower end of the mount 12*c*. Accordingly, similar to the first embodiment and the second embodiment, a workpiece 74*c* can be stopped and positioned by the distal end 72*c*.

On the other hand, when the ambient temperature rises and the wax 70*c* expands, the volume of the wax 70*c* displaces the shaft 44*c* through the seal member 82*c* toward the side of the cap 60*c*. More specifically, since the expanded wax 70*c* presses the tapered surface 84*c* of the shaft 44*c* through the seal member 82*c*, the shaft 44*c* rises to the position shown in FIG. 3B, and the top of the shaft 44*c* arrives at the inner wall of the cap 60*c*. As a result, since a retreating operation of the shaft 44*c* as a whole is carried out with respect to the casing 14*c*, the workpiece 74*c* that engages with the distal end 72*c* of the shaft 44*c* can be displaced again to a next position by the non-illustrated conveyor.

Figure 4A:
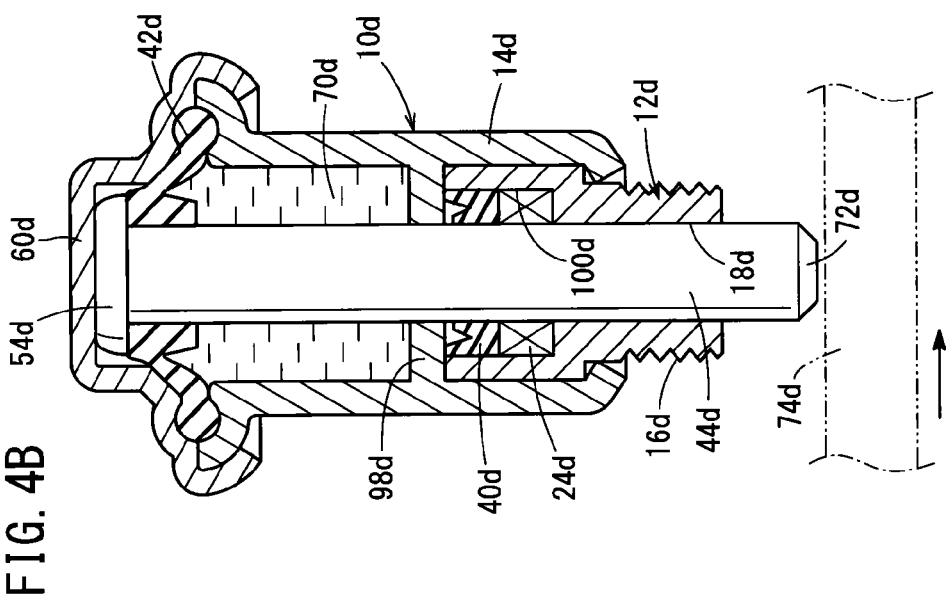
FIG. 4A is a vertical cross-sectional view showing an extended state of a shaft of a thermoelement according to a fourth embodiment of the present invention.
Figure 4B:
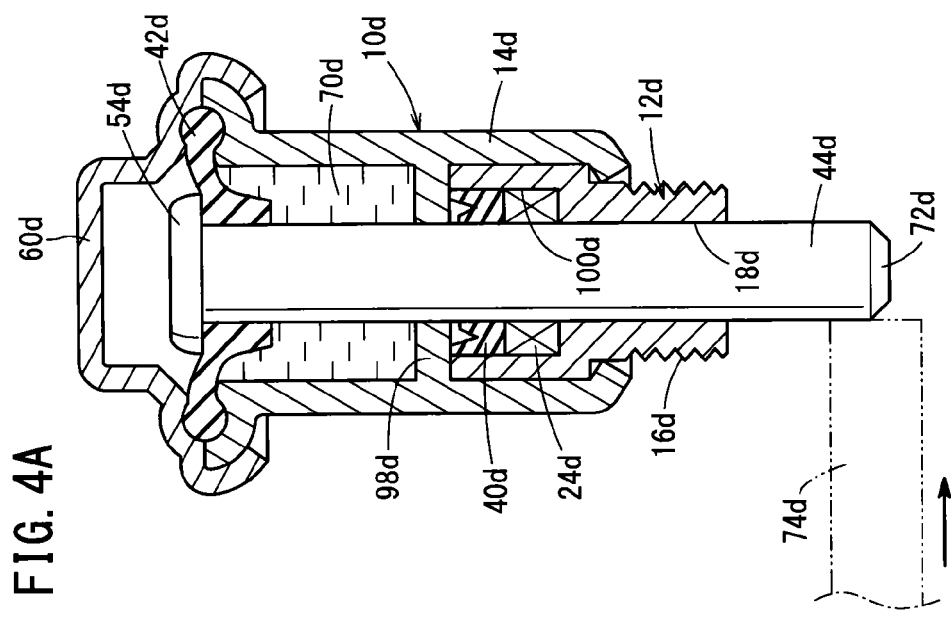
FIG. 4B is a vertical cross-sectional view showing a contracted state of the shaft.

FIGS. 4A and 4B show a fourth embodiment of the thermoelement according to the present invention.

In the fourth embodiment, a shaft 44*d*, which can be displaced along a through hole 18*d* disposed on the axis of a mount 12*d* constituting a thermoelement 10*d*, is of the same diameter from the bottom end to the upper end thereof, and a flange 54*d* is disposed on the upper end thereof. A seal member 42*d* is disposed in contact with the flange 54*d*. More specifically, the outer circumferential end of the seal member 42*d*, which is sandwiched between a casing 14*d* and a cap 60*d* that is crimped and fixed to the casing 14*d*, is of a disk shape. The outer circumferential end of the seal member 42*d* is retained by the cap 60*d* and the upper end of the casing 14*d*, and the shaft 44*d* is inserted through a hole provided in the center of the seal member 42*d*.

A partition wall 98*d* through which the shaft 44*d* is inserted is disposed at a midway location of the casing 14*d*, and an annular groove 100*d* with an open upper end is disposed in the mount 12*d*. A guide member 24*d* and a seal member 40*d* are stacked and arranged between the annular groove 100*d*, the shaft 44*d*, and the lower surface of the partition wall 98*d*. In FIGS. 4A and 4B, reference character 70*d* indicates a fluid, for example, a thermally expansive wax.

In the fourth embodiment, similar to the first through third embodiments, the wax 70*d* expands due to a rise in the ambient temperature, whereby the seal member 42*d* is pressed upwardly in FIGS. 4A and 4B, and the shaft 44*d* undergoes movement until the top surface of the flange 54*d* comes into abutment against the inner wall of the cap 60*d*. Such an abutting condition is shown in FIG. 4B. According to the thermoelement 10*d* of the fourth embodiment, the same effects and advantages as those of the thermoelements 10*a* to 10*c* according to the first through third embodiments can be obtained.

Figure 5A:
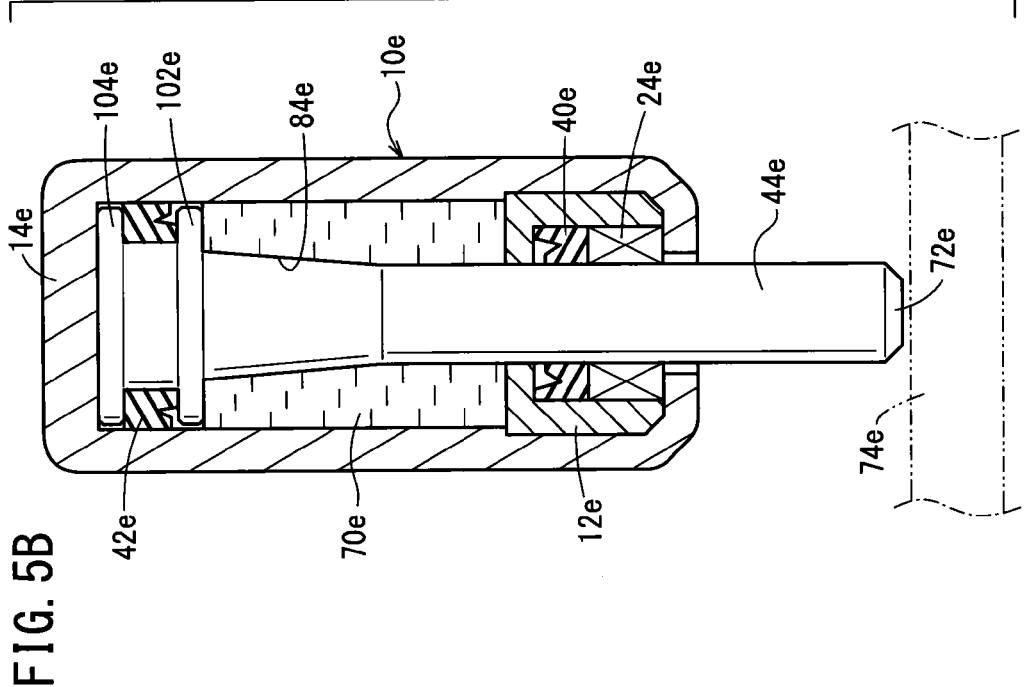
FIG. 5A is a vertical cross-sectional view showing an extended state of a shaft of a thermoelement according to a fifth embodiment of the present invention.
Figure 5B:
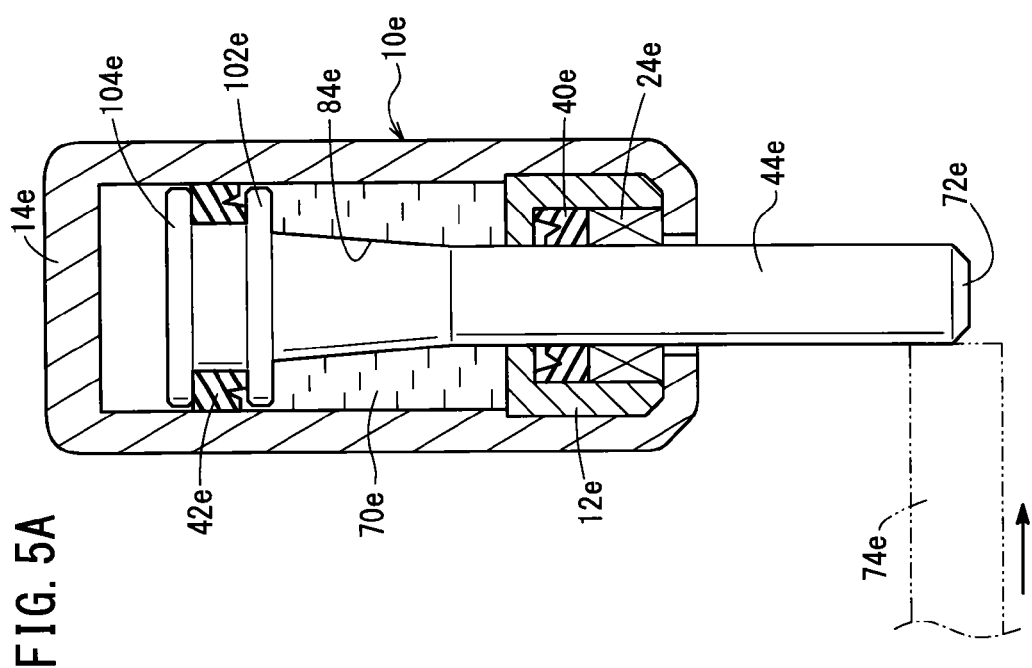
FIG. 5B is a vertical cross-sectional view showing a contracted state of the shaft.

FIGS. 5A and 5B show a fifth embodiment of the thermoelement according to the present invention.

In the fifth embodiment, a mount 12*e* is accommodated in the interior of a bottomed cylindrical casing 14*e*, and the casing 14*e* and the mount 12*e* are integrated together by crimping the lower end of the casing 14*e*. A guide member 24*e* and a seal member 40*e* are stacked and arranged in the interior of the mount 12*e*. A shaft 44*e* includes a tapered surface 84*e*, and at a position where the tapered surface 84*e* terminates, as shown in FIGS. 5A and 5B, annular projections 102e, 104e are separated mutually and formed integrally at upper and lower locations. A seal member 42e is accommodated between the annular projections 102e, 104e. A wax 70e is enclosed in a chamber defined between the casing 14e and the shaft 44e including the tapered surface 84e.

In such a structure, the wax 70e undergoes expansion when a predetermined temperature is reached due to a change in the ambient temperature. By the expanded volume thereof, the annular projection 102e serves as a pressure receiving surface, and since the tapered surface 84e is of a shape that expands in diameter upwardly, the shaft 44e is displaced upwardly in the drawing, and ultimately, the top surface of the annular projection 104e arrives at the inner wall surface of the casing 14e. Consequently, in this way, since a distal end 72e of the shaft 44e undergoes a retracting operation, as shown in FIG. 5B, is pulled into the interior of the casing 14e, the same actions and effects as those of the first through fourth embodiments are carried out.

Next, thermovalves, in which thermoelements 10a to 10e constructed in the foregoing manner are incorporated, will be described in detail below with reference to FIG. 6 and subsequent drawings.

Figure 6:
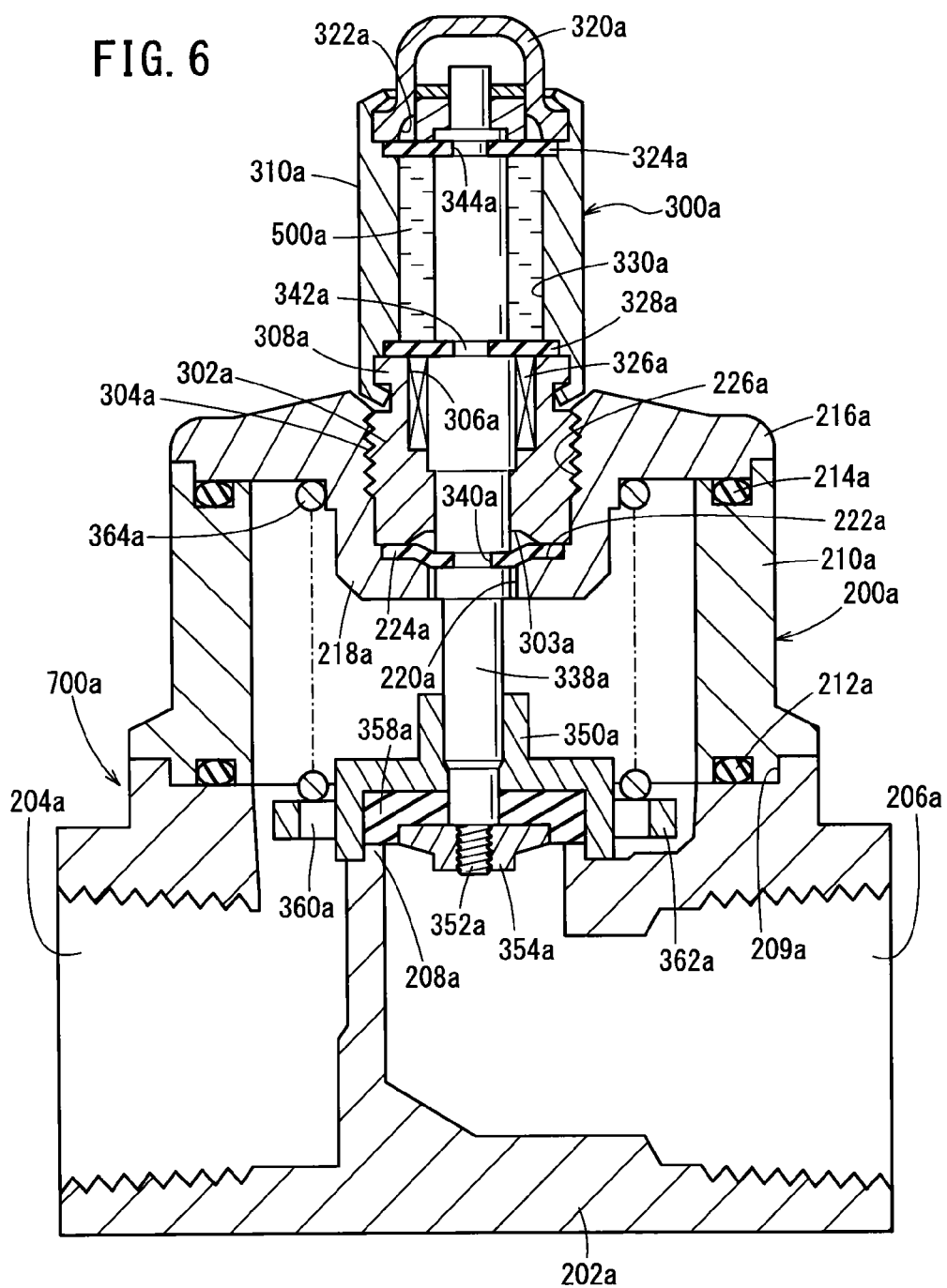
FIG. 6 is a vertical cross-sectional view showing a first embodiment of a thermovalve in which a thermoelement according to the present invention is incorporated, and in which a valve plug thereof is in a closed state.
Figure 7:
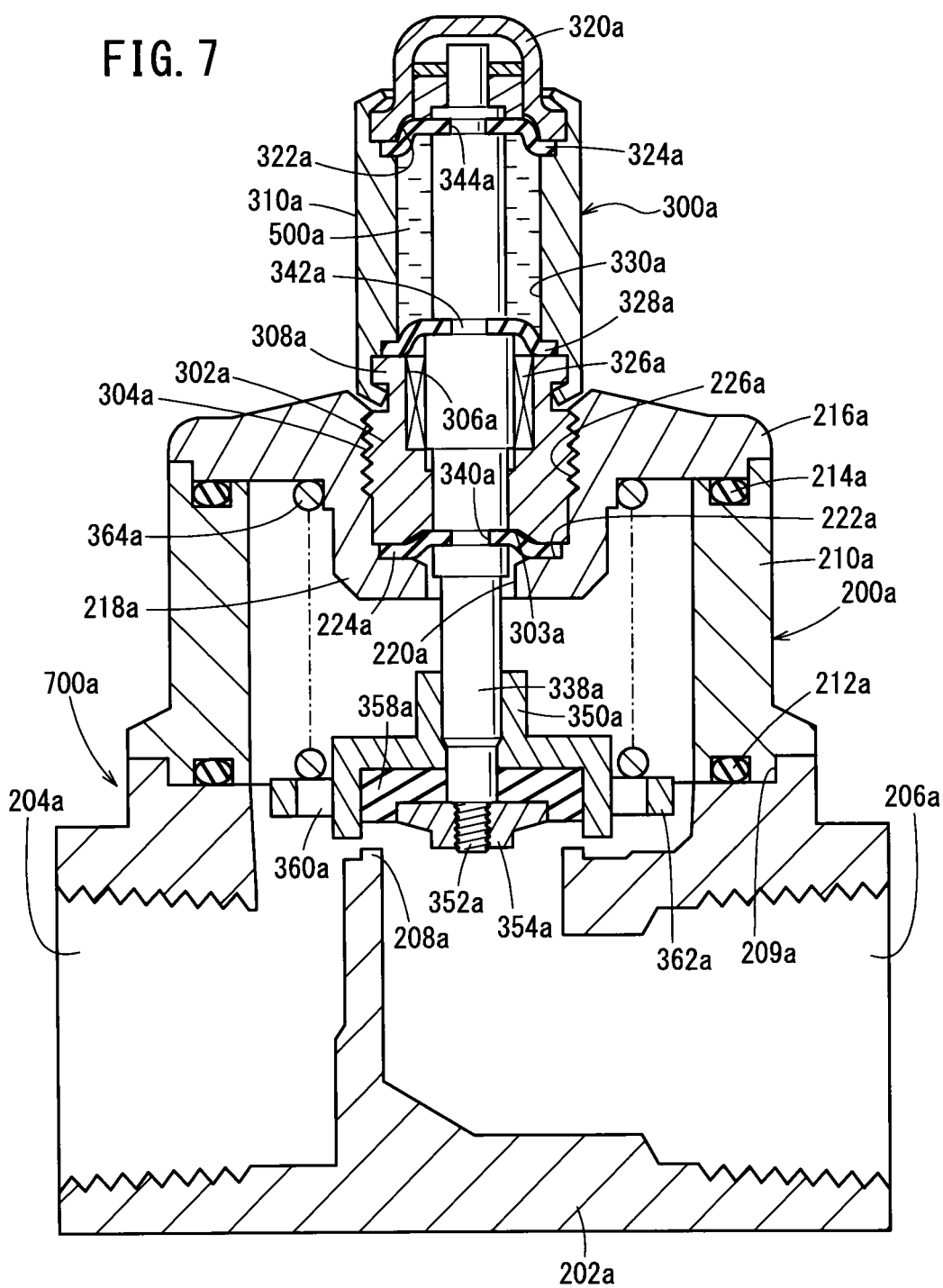
FIG. 7 is a vertical cross-sectional view showing a state in which the valve plug of the thermovalve shown in FIG. 6 is opened.

FIGS. 6 and 7 show a direct-acting type two port thermovalve 200a. The thermovalve 200a includes a body 202a. On one end of the body 202a, an inlet port 204a is formed through which a pressure fluid is introduced, and on the other end of the body 202a, an outlet port 206a is formed. A seat member 208a is formed in an upstanding manner from the bottom of the body 202a in a direction substantially perpendicular to an axis extending between the inlet port 204a and the outlet port 206a. As shown in FIGS. 6 and 7, using a top stepped part 209a of the body 202a, a cylindrical cover 210a is erected on the body 202a. A seal member 212a made up from an O-ring is interposed between the body 202a and the cover 210a. As shown in FIGS. 6 and 7, through another seal member 214a made up from an O-ring, a bonnet 216a is fixed on an upper end of the cover 210a.

The bonnet 216a includes a projection 218a that projects on a side of the body 202a at a central location in the axial direction thereof. A hole 220a is disposed at the bottom of the projection 218a. A shaft 338a, which constitutes part of a thermoelement 300a, penetrates through the hole 220a. The thermoelement 300a is constructed substantially the same or similar to the thermoelements 10a to 10e shown in the embodiments of FIGS. 1A to 5B, and performs substantially the same or similar functions. In relation to the thermoelement 300a, using an upper stepped part 222a of the projection 218a, a seal member 224a is seated on an upper end where the hole 220a terminates. Screw grooves 226a are disposed on an inner circumferential surface of a hole that is provided along the axis of the bonnet 216a. The thermoelement 300a is attached using the screw grooves 226a.

More specifically, a mount 302a that makes up part of the thermoelement 300a is included, and screw grooves 304a are disposed on a portion of the outer circumferential wall of the mount 302a. The screw grooves 304a are screw-engaged with the screw grooves 226a of the bonnet 216a. A recess 303a is formed in the center of a lower end of the mount 302a, and a stepped part 306a is provided on an upper end side thereof.

The stepped part 306a extends therearound in an annular shape and is formed with an outwardly projecting flange 308a. A casing 310a is fixed by crimping a bottom portion thereof over the flange 308a.

As understood from FIGS. 6 and 7, the casing 310a is cylindrical in shape, and a cap 320a is fitted on a top portion thereof. The cap 320a is positioned and fixed by crimping an upper end part of the casing 310a inwardly over the cap 320a. The cap 320a includes an annular recess 322a that opens in an axial direction on the bottom of the cap 320a, and the bottom of the cap 320a presses firmly on a seal member 324a. A guide member 326a is fitted in the stepped part 306a of the mount 302a, and a seal member 328a is fixed to an upper portion of the guide member 326a, so as to press against an inside stepped part provided on the casing 310a.

Accordingly, an annular space 330a is formed between the seal member 328a and the seal member 324a, and a wax 500a, for example, which undergoes expansion due to a rise in the ambient temperature, is enclosed in the interior of the annular space 330a.

As understood from FIGS. 6 and 7, the shaft 338a, which passes from below the cap 320a and through the hole 220a and is directed toward the seat member 208a, extends so as to penetrate through the annular space 330a that encloses the wax 500a. An annular groove 340a in which the seal member 224a is fitted, an annular groove 342a in which the seal member 328a is fitted, and an annular groove 344a in which the seal member 324a is fitted, are formed respectively along the shaft 338a while being separated mutually by predetermined distances.

A retaining member 350a is fixed to the lower end of the shaft 338a. More specifically, the retaining member 350a includes a ring-shaped body 354a, with which screw threads 352a provided on the lower end of the shaft 338a are screw-engaged. A valve plug 358a made of synthetic rubber or the like is sandwiched between the ring-shaped body 354a and the retaining member 350a.

As will be described later, the valve plug 358a is displaceable and is capable of pressing against the top surface of the seat member 208a. A disk 362a, in which plural holes 360a are formed concentrically, is fixed to the retaining member 350a. A coil spring 364a is disposed between the bonnet 216a and the disk 362a in surrounding relation to the projection 218a, the shaft 338a, and the retaining member 350a. The coil spring 364a applies a pressing force to elastically press the disk 362a in a downward direction, and as a result, the valve plug 358a, which is held in the retaining member 350a, is pressed normally against the seat member 208a.

The body 202a, the seat member 208a, and the valve plug 358a collectively constitute a valve main body 700a.

The thermovalve 200a according to the present invention is constructed basically as described above. Next, operations and effects of the thermovalve 200a will be described.

Under ordinary temperature, for example, in the case that the surrounding ambient temperature is 25° C., the wax 500a enclosed in the annular space 330a does not yet undergo expansion. Consequently, only by the elastic force of the coil spring 364a, the retaining member 350a is pressed downwardly in FIGS. 6 and 7, and the valve plug 358a is pressed against the seat member 208a. Therefore, since the seat member 208a is in a stopped condition in cooperation with the valve plug 358a, the fluid introduced from the inlet port 204a is not led out to the outlet port 206a.

As the ambient temperature gradually rises and the wax 500a begins to expand, the expansive force thereof causes the seal member 324a to flex upwardly. As a result, the shaft 338a also rises, accompanied by the seal member 224a, which is mounted on the annular groove 340a, and the seal member 328a, which is mounted on the annular groove 342a, also being flexed in an upward direction. Such a feature implies that the valve plug 358a rises upwardly from the seat member 208a in opposition to the elastic force of the coil spring 364a. As a result, the inlet port 204a and the outlet port 206a are placed in communication, and the fluid that was introduced from the inlet port 204a passes between the seat member 208a and the valve plug 358a, and is led out to the outlet port 206a.

On the other hand, by the ambient temperature returning to the normal temperature, the wax 500a undergoes contraction, whereupon the shaft 338a descends in the drawing, and in the thermovalve 200a, the valve plug 358a becomes seated again on the seat member 208a. As a result, communication between the inlet port 204a and the outlet port 206a is blocked.

The thermovalve 200a of the present embodiment focuses attention on the expanding and contracting function of the wax 500a responsive to changes in the ambient temperature, so that, in particular, the shaft 338a is displaced upwardly when a thermally expansive medium, preferably the wax 500a, undergoes expansion accompanying a rise in the ambient temperature. More specifically, the shaft 338a is pulled inwardly toward the side of the thermoelement 300a, and consequently, an opening operation can be performed without impeding progress in the flow of the fluid that flows from the inlet port 204a to the outlet port 206a. Further, since an operation of pulling the shaft 338a inwardly is carried out, even if foreign matter intrudes into the fluid passage, biting-in of such foreign matter does not occur.

Figure 8:
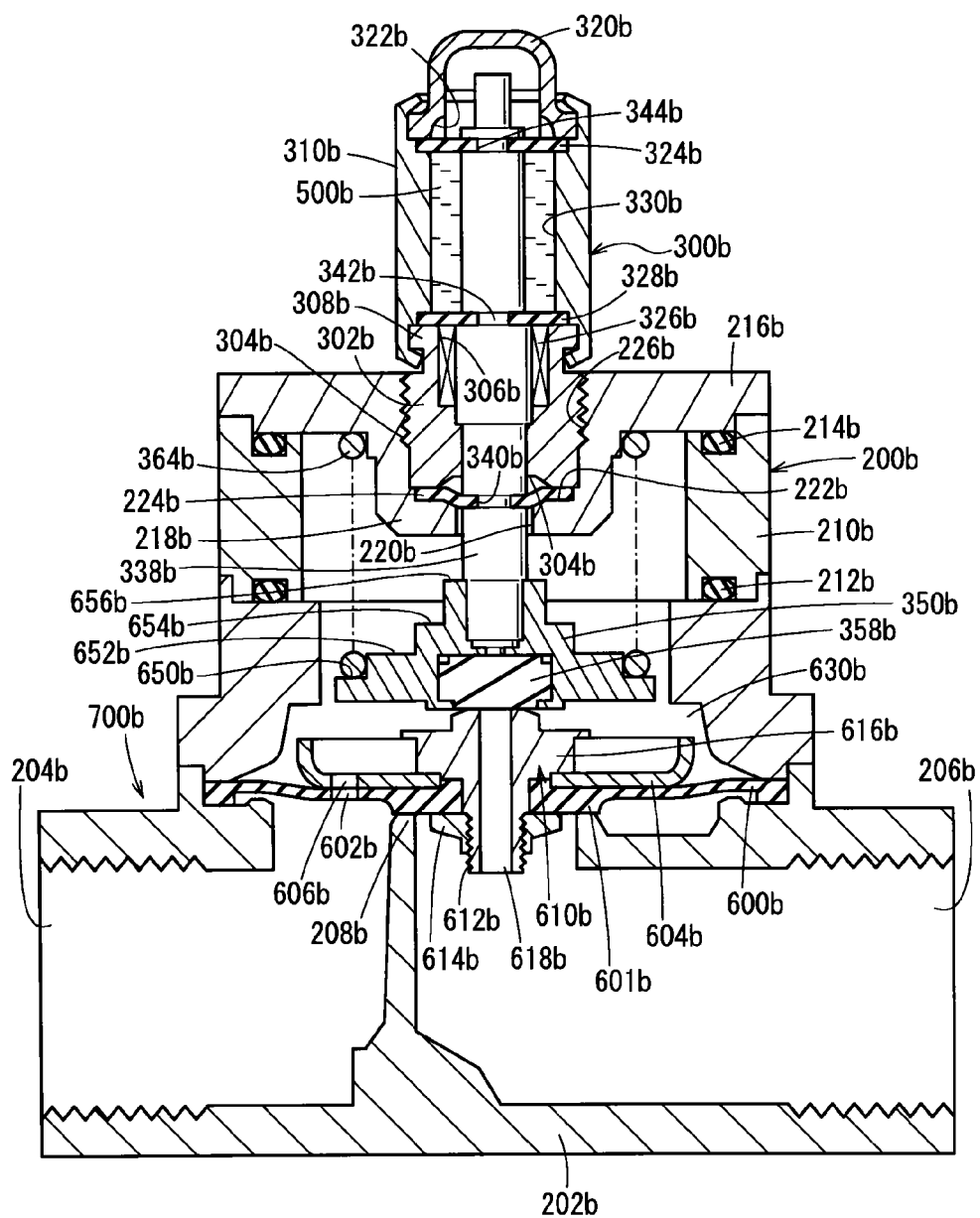
FIG. 8 is a vertical cross-sectional view showing a second embodiment of a thermovalve in which a thermoelement according to the present invention is incorporated, and in which a valve plug thereof is in a closed state.
Figure 9:
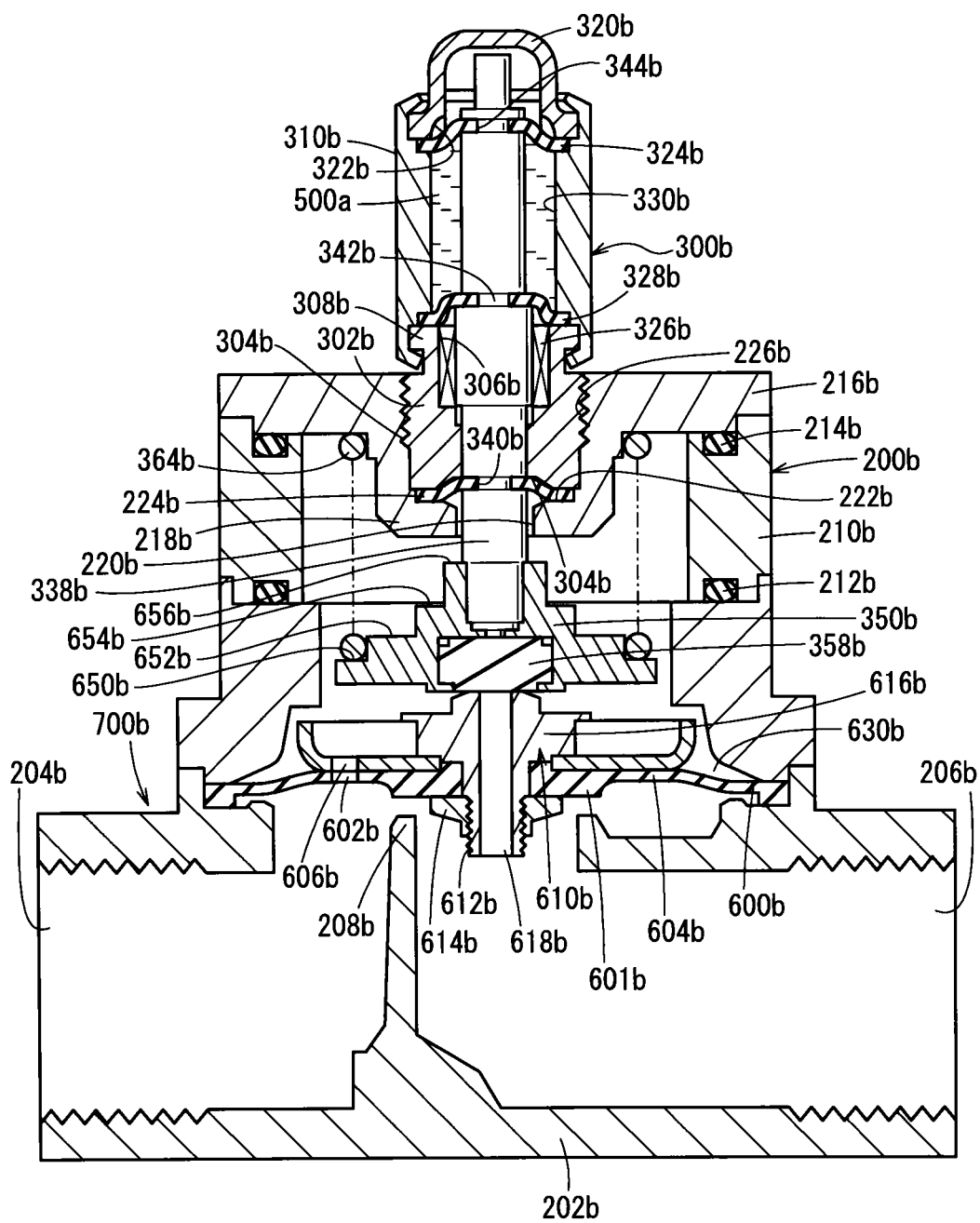
FIG. 9 is a vertical cross-sectional view showing a state in which the valve plug of the thermovalve shown in FIG. 8 is opened.

FIGS. 8 and 9 show another embodiment of the thermovalve according to the present invention.

With the thermovalve according to the second embodiment, several constituent elements thereof, which are the same as those of the thermovalve 200a according to the first embodiment, are designated using the same reference numerals, by appending trailing lower case English letters to the reference numerals as they are, and detailed description of such features is omitted.

A thermovalve 200b according to the second embodiment is a pilot type two-port thermovalve. The pilot type two-port thermovalve 200b includes a diaphragm 600b disposed between a cover 210b and a body 202b. More specifically, the diaphragm 600b is sandwiched and gripped between the cover 210b and the body 202b. A bulging portion 601b is formed substantially in the center on a lower surface of the diaphragm 600b, and a hole 602b is provided therein between the bulging portion 601b and a circumferential edge portion of the diaphragm 600b. A disk 604b, a peripheral region of which is bent upwardly, is disposed concentrically with the diaphragm 600b. A hole 606b provided in the disk 604b is of the same diameter as the hole 602b of the diaphragm 600b and communicates mutually therewith. The diaphragm 600b and the disk 604b are sandwiched and held together integrally at the axis thereof by a gripping member 610b. More specifically, the gripping member 610b includes screw threads 612b on a lower end thereof, and by screw-engagement of a nut 614b onto the threads 612b, the diaphragm 600b and the disk 604b are firmly clamped between the nut 614b and a main body 616b of the gripping member 610b. An orifice 618b is provided in the form of a through hole that penetrates through the axis of the gripping member 610b. The diameter of the orifice 618b is slightly greater in diameter than the holes 602b, 606b. An upper distal end of the orifice 618b is capable of abutting against a valve plug 358b, which is disposed on a lower portion in the center of a retaining member 350b.

The retaining member 350b will now be described. As shown in FIGS. 8 and 9, the retaining member 350b is installed on a lower end of a shaft 338b, which is formed with steps along the longitudinal direction thereof. The retaining member 350b includes stepped parts 650b, 652b, 654b, and 656b having different diameters respectively along the axial direction. The valve plug 358b is installed centrally in the lower surface of the retaining member 350b. The valve plug 358b is formed by an elastic body made of synthetic rubber. A coil spring 364b is interposed between a bonnet 216b and the largest diameter stepped part 650b. By the elastic force of the coil spring 364b, the valve plug 358b acts to close the upper end of the orifice 618b of the gripping member 610b. The retaining member 350b and the disk 604b, etc., are disposed in the interior of a chamber 630b.

The body 202b, a seat member 208b, and the valve plug 358b collectively constitute a valve main body 700b.

In FIGS. 8 and 9, reference character 300b indicates a thermoelement in which the valve main body 700b is incorporated, reference character 302b indicates a mount, and reference character 310b indicates a casing.

The thermovalve 200b according to the second embodiment of the present invention is constructed as described above. Next, operations and effects of the thermovalve 200b will be described.

Under ordinary temperature, for example, in the case that the ambient temperature is 25° C., a wax 500b does not undergo expansion. Consequently, the elastic force of the coil spring 364b presses the retaining member 350b downward, and the valve plug 358b closes the orifice 618b of the gripping member 610b. As a result, a state is brought about in which flow of the fluid between an inlet port 204b and an outlet port 206b is blocked. More specifically, a condition is provided in which the bulging portion 601b of the diaphragm 600b is pressed against the seat member 208b.

At this time, although the fluid from the inlet port 204b enters into the chamber 630b from the holes 602b, 606b, since the chamber 630b is at the same pressure as the inlet port 204b, the diaphragm 600b is not displaced.

Due to a rise in the ambient temperature, the wax 500b undergoes expansion. Consequently, a seal member 324b is flexed upwardly, and as a result, the shaft 338b rises, and ultimately, the retaining member 350b that is connected to the shaft 338b is raised upwardly. Thus, the valve plug 358b that closes the orifice 618b of the gripping member 610b separates away from the upper end of the orifice 618b. By the aforementioned actions, communication is established mutually between the inlet port 204b, the chamber 630b, and the outlet port 206b. As a result, the fluid that is introduced from the inlet port 204a passes through the holes 602b, 606b, and further, from the orifice 618b, the fluid arrives at the outlet port 206b and is led out to the exterior. During this time, since the opening diameter of the orifice 618b is of a larger diameter than the holes 602b, 606b, the fluid can easily be led out to the outlet port 206b.

If the ambient temperature decreases, the wax 500b undergoes contraction, whereupon the shaft 338b descends, and the valve plug 358b once again closes the orifice 618b. As a result, the state of communication between the inlet port 204b and the outlet port 206b is blocked.

With the thermoelement according to the present invention, when the ambient temperature reaches a predetermined value, the wax expands and the shaft is pulled or drawn in toward the side of the casing. On the other hand, in the case that the ambient temperature is less than the predetermined temperature, the wax contracts and the shaft extends. Consequently, a control for transporting workpieces or a flow-through control for a fluid can be carried out accurately responsive to a change in temperature. Further, with the thermovalve according to the present invention, responsive to changes in the ambient temperature, advancing and retracting operations of the shaft that is connected to the thermoelement are performed, and opening and closing operations of the valve plug are carried out. In particular, when the ambient temperature becomes greater than or equal to the predetermined temperature, expansion of the wax causes the valve plug that faces toward the fluid passage to retract, and the fluid passage opens as large as possible. Accordingly, the fluid is allowed to flow sufficiently. Further, even if foreign matter infiltrates into the interior of the fluid passage, damage to the valve plug, etc., does not occur. Stated otherwise, an effect is obtained in that biting-in of such foreign matter can be prevented.

Although preferred embodiments of the present invention have been described above, the present invention is not limited to such embodiments, and various changes and modifications may be made to the embodiments without departing from the gist of the invention.

The invention claimed is:

1. A thermoelement comprising:
    a casing;
    a mount formed integrally with the casing and which is attached to an object;
    a shaft arranged displaceably in an interior of the casing with one end thereof being exposed to an exterior from the mount;
    a thermosensitive medium enclosed in the interior of the casing and which expands and contracts responsive to a change in ambient temperature surrounding the casing; and
    a seal member that pulls the shaft toward a side of the casing upon expansion of the thermosensitive medium.

2. The thermoelement according to claim 1, wherein the seal member engages with another end of the shaft, and the shaft is pulled into the casing by flexure of the seal member in response to expansion of the thermosensitive medium.

3. The thermoelement according to claim 1, wherein a tapered surface, which expands in diameter toward the other end, is formed on a side of the other end of the shaft.

4. The thermoelement according to claim 3, wherein:
    a portion of the seal member is in contact with the tapered surface; and
    upon expansion of the thermosensitive medium, the portion of the seal member is pressed against the tapered surface of the shaft, and the shaft is displaced toward the other end side.

5. A thermovalve includes a thermoelement, and a valve main body in which the thermoelement is incorporated;
    the thermoelement comprising:
    a casing;
    a mount formed integrally with the casing and which is attached to an object;
    a shaft arranged displaceably in an interior of the casing with one end thereof being exposed to an exterior from the mount;
    a thermosensitive medium enclosed in the interior of the casing and which expands and contracts responsive to a change in ambient temperature surrounding the casing; and
    a seal member that pulls the shaft toward a side of the casing upon expansion of the thermosensitive medium;
    the valve main body including a body formed with an inlet port into which a fluid is introduced and an outlet port through which the fluid is led out, a seat member disposed between the inlet port and the outlet port, and a valve plug that presses against and separates away from the seat member;
    wherein one end of the shaft constituting the thermoelement is connected to the valve plug; and
    upon expansion of the thermosensitive medium, the seal member pulls the shaft, whereby the valve plug is made to separate away from the seat member and allow communication between the inlet port and the outlet port.

6. The thermovalve according to claim 5 in which a thermoelement is incorporated, wherein the thermovalve is a direct-acting type of thermovalve.

7. The thermovalve according to claim 5 in which a thermoelement is incorporated, wherein the thermovalve is a pilot type of thermovalve.

* * * * *